US008370948B2

(12) United States Patent
Troyansky

(10) Patent No.: US 8,370,948 B2
(45) Date of Patent: Feb. 5, 2013

(54) SYSTEM AND METHOD FOR ANALYSIS OF ELECTRONIC INFORMATION DISSEMINATION EVENTS

(75) Inventor: Lidror Troyansky, Givatayim (IL)

(73) Assignee: Websense, Inc., San Diego, CA (US)

( * ) Notice: Subject to any disclaimer, the term of this patent is extended or adjusted under 35 U.S.C. 154(b) by 822 days.

(21) Appl. No.: 12/051,709

(22) Filed: Mar. 19, 2008

(65) Prior Publication Data
US 2009/0241197 A1     Sep. 24, 2009

(51) Int. Cl.
H04L 29/06      (2006.01)
(52) U.S. Cl. .................................. 726/26; 726/2; 726/22
(58) Field of Classification Search .......................... None
See application file for complete search history.

(56) References Cited

U.S. PATENT DOCUMENTS

| | | |
|---|---|---|
| 5,414,833 A | 5/1995 | Hershey et al. |
| 5,581,804 A | 12/1996 | Cameron et al. |
| 5,590,403 A | 12/1996 | Cameron et al. |
| 5,596,330 A | 1/1997 | Yokev et al. |
| 5,712,979 A | 1/1998 | Graber et al. |
| 5,720,033 A | 2/1998 | Deo |
| 5,724,576 A | 3/1998 | Letourneau |
| 5,801,747 A | 9/1998 | Bedard |
| 5,828,835 A | 10/1998 | Isfeld et al. |
| 5,832,228 A | 11/1998 | Holden et al. |
| 5,899,991 A | 5/1999 | Karch |
| 5,919,257 A | 7/1999 | Trostle |
| 5,937,404 A | 8/1999 | Csaszar et al. |
| 6,012,832 A | 1/2000 | Saunders et al. |
| 6,092,194 A | 7/2000 | Touboul |
| 6,185,681 B1 | 2/2001 | Zizzi |
| 6,301,658 B1 | 10/2001 | Koehler |
| 6,338,088 B1 | 1/2002 | Waters et al. |
| 6,357,010 B1 | 3/2002 | Viets et al. |

(Continued)

FOREIGN PATENT DOCUMENTS

| | | |
|---|---|---|
| CN | 1756147 A | 4/2006 |
| EP | 1 180 889 | 2/2002 |

(Continued)

OTHER PUBLICATIONS

Matson; Ulieru. 2006. Persistent information security: beyond the e-commerce threat model. In Proceedings of the 8th international conference on Electronic commerce: The new e-commerce: innovations for conquering current barriers, obstacles and limitations to conducting successful business on the internet (ICEC '06). ACM, NY, p. 271-277.*

(Continued)

*Primary Examiner* — Eleni Shiferaw
*Assistant Examiner* — Jeffery Williams
(74) *Attorney, Agent, or Firm* — Knobbe Martens Olson & Bear LLP

(57) ABSTRACT

A system and method for determining an intent of a sender in transmitting electronic information in order to prevent unauthorized dissemination of electronic information is disclosed. The system and method facilitate cost-effective handling of dissemination events and comprise a traffic analyzer configured to analyze descriptors of the electronic information and parameters of the transmission of the electronic information in order to determine the intent of the sender. By determining the intent of the sender, it is possible to effectively quarantine the electronic information before it is disseminated.

18 Claims, 6 Drawing Sheets

U.S. PATENT DOCUMENTS

| | | | |
|---|---|---|---|
| 6,460,141 B1 | 10/2002 | Olden | |
| 6,493,758 B1 | 12/2002 | McLain | |
| 6,804,780 B1 | 10/2004 | Touboul | |
| 6,832,230 B1 | 12/2004 | Zilliacus et al. | |
| 6,988,209 B1 | 1/2006 | Balasubramaniam et al. | |
| 7,051,200 B1 | 5/2006 | Manferdelli et al. | |
| 7,058,822 B2 | 6/2006 | Edery et al. | |
| 7,080,000 B1 | 7/2006 | Cambridge | |
| 7,100,199 B2 | 8/2006 | Ginter et al. | |
| 7,136,867 B1 | 11/2006 | Chatterjee et al. | |
| 7,185,361 B1 | 2/2007 | Ashoff et al. | |
| 7,249,175 B1* | 7/2007 | Donaldson | 709/225 |
| 7,346,512 B2 | 3/2008 | Li-chun Wang et al. | |
| 7,376,969 B1 | 5/2008 | Njemanze et al. | |
| 7,447,215 B2 | 11/2008 | Lynch et al. | |
| 7,536,437 B2 | 5/2009 | Zmolek | |
| 7,617,532 B1 | 11/2009 | Alexander et al. | |
| 7,634,463 B1* | 12/2009 | Katragadda et al. | 701/431 |
| 7,644,127 B2* | 1/2010 | Yu | 709/206 |
| 7,693,945 B1* | 4/2010 | Dulitz et al. | 709/206 |
| 7,707,157 B1 | 4/2010 | Shen | |
| 7,725,937 B1 | 5/2010 | Levy | |
| 7,783,706 B1* | 8/2010 | Robinson | 709/206 |
| 2001/0047474 A1 | 11/2001 | Takagi | |
| 2002/0078045 A1 | 6/2002 | Dutta | |
| 2002/0087882 A1 | 7/2002 | Schneier et al. | |
| 2002/0091947 A1 | 7/2002 | Nakamura | |
| 2002/0095592 A1 | 7/2002 | Daniell et al. | |
| 2002/0099952 A1 | 7/2002 | Lambert et al. | |
| 2002/0129140 A1* | 9/2002 | Peled et al. | 709/224 |
| 2002/0129277 A1 | 9/2002 | Caccavale | |
| 2002/0162015 A1 | 10/2002 | Tang | |
| 2002/0174358 A1 | 11/2002 | Wolff et al. | |
| 2003/0018491 A1 | 1/2003 | Nakahara et al. | |
| 2003/0018903 A1 | 1/2003 | Greca et al. | |
| 2003/0074567 A1 | 4/2003 | Charbonneau | |
| 2003/0093518 A1* | 5/2003 | Hiraga | 709/224 |
| 2003/0093694 A1 | 5/2003 | Medvinsky et al. | |
| 2003/0110168 A1 | 6/2003 | Kester et al. | |
| 2003/0135756 A1 | 7/2003 | Verma | |
| 2003/0172292 A1* | 9/2003 | Judge | 713/200 |
| 2003/0177361 A1* | 9/2003 | Wheeler et al. | 713/176 |
| 2003/0185395 A1 | 10/2003 | Lee et al. | |
| 2003/0185399 A1 | 10/2003 | Ishiguro | |
| 2003/0188197 A1* | 10/2003 | Miyata et al. | 713/201 |
| 2004/0003139 A1 | 1/2004 | Cottrille et al. | |
| 2004/0003286 A1 | 1/2004 | Kaler et al. | |
| 2004/0034794 A1 | 2/2004 | Mayer et al. | |
| 2004/0103162 A1* | 5/2004 | Meister et al. | 709/206 |
| 2004/0117624 A1 | 6/2004 | Brandt et al. | |
| 2004/0139351 A1 | 7/2004 | Tsang | |
| 2004/0153644 A1 | 8/2004 | McCorkendale | |
| 2004/0162876 A1 | 8/2004 | Kohavi | |
| 2004/0187029 A1 | 9/2004 | Ting | |
| 2004/0255147 A1* | 12/2004 | Peled et al. | 713/200 |
| 2004/0260924 A1* | 12/2004 | Peled et al. | 713/166 |
| 2005/0025291 A1* | 2/2005 | Peled et al. | 379/88.13 |
| 2005/0027980 A1* | 2/2005 | Peled et al. | 713/164 |
| 2005/0033967 A1 | 2/2005 | Morino et al. | |
| 2005/0055327 A1 | 3/2005 | Agrawal et al. | |
| 2005/0066197 A1 | 3/2005 | Hirata et al. | |
| 2005/0086520 A1 | 4/2005 | Dharmapurikar et al. | |
| 2005/0091535 A1 | 4/2005 | Kavalam et al. | |
| 2005/0108557 A1 | 5/2005 | Kayo et al. | |
| 2005/0120229 A1 | 6/2005 | Lahti | |
| 2005/0131868 A1 | 6/2005 | Lin et al. | |
| 2005/0138109 A1 | 6/2005 | Redlich et al. | |
| 2005/0138353 A1 | 6/2005 | Spies | |
| 2005/0210035 A1 | 9/2005 | Kester et al. | |
| 2005/0223001 A1 | 10/2005 | Kester et al. | |
| 2005/0251862 A1 | 11/2005 | Talvitie | |
| 2005/0273858 A1 | 12/2005 | Zadok et al. | |
| 2005/0278430 A1* | 12/2005 | Cato | 709/206 |
| 2005/0283836 A1 | 12/2005 | Lalonde et al. | |
| 2005/0288939 A1* | 12/2005 | Peled et al. | 705/1 |
| 2006/0004636 A1 | 1/2006 | Kester et al. | |
| 2006/0020814 A1 | 1/2006 | Lieblich et al. | |
| 2006/0021031 A1 | 1/2006 | Leahy et al. | |
| 2006/0026105 A1 | 2/2006 | Endoh | |
| 2006/0026681 A1 | 2/2006 | Zakas | |
| 2006/0031504 A1 | 2/2006 | Hegli et al. | |
| 2006/0036874 A1 | 2/2006 | Cockerille et al. | |
| 2006/0053488 A1 | 3/2006 | Sinclair et al. | |
| 2006/0068755 A1 | 3/2006 | Shraim et al. | |
| 2006/0080735 A1 | 4/2006 | Brinson et al. | |
| 2006/0095459 A1 | 5/2006 | Adelman et al. | |
| 2006/0095965 A1 | 5/2006 | Phillips et al. | |
| 2006/0101514 A1 | 5/2006 | Milener et al. | |
| 2006/0129644 A1 | 6/2006 | Owen et al. | |
| 2006/0191008 A1 | 8/2006 | Fernando et al. | |
| 2006/0212723 A1 | 9/2006 | Sheymov | |
| 2006/0251068 A1* | 11/2006 | Judge et al. | 370/389 |
| 2006/0259948 A1 | 11/2006 | Calow et al. | |
| 2006/0265750 A1 | 11/2006 | Huddleston | |
| 2006/0272024 A1 | 11/2006 | Huang et al. | |
| 2006/0277259 A1* | 12/2006 | Murphy et al. | 709/206 |
| 2006/0282890 A1 | 12/2006 | Gruper et al. | |
| 2006/0288076 A1 | 12/2006 | Cowings et al. | |
| 2007/0005762 A1 | 1/2007 | Knox et al. | |
| 2007/0011739 A1 | 1/2007 | Zamir et al. | |
| 2007/0027965 A1* | 2/2007 | Brenes et al. | 709/220 |
| 2007/0028302 A1 | 2/2007 | Brennan et al. | |
| 2007/0067844 A1 | 3/2007 | Williamson et al. | |
| 2007/0143424 A1* | 6/2007 | Schirmer et al. | 709/206 |
| 2007/0150827 A1 | 6/2007 | Singh et al. | |
| 2007/0156833 A1 | 7/2007 | Nikolov et al. | |
| 2007/0195779 A1* | 8/2007 | Judge et al. | 370/392 |
| 2007/0199054 A1 | 8/2007 | Florencio et al. | |
| 2007/0226300 A1* | 9/2007 | Smith et al. | 709/206 |
| 2007/0260602 A1 | 11/2007 | Taylor | |
| 2007/0261112 A1 | 11/2007 | Todd et al. | |
| 2007/0294199 A1 | 12/2007 | Nelken et al. | |
| 2007/0294428 A1* | 12/2007 | Guy et al. | 709/245 |
| 2007/0299915 A1 | 12/2007 | Sharim et al. | |
| 2008/0040804 A1 | 2/2008 | Oliver et al. | |
| 2008/0047017 A1 | 2/2008 | Renaud | |
| 2008/0262991 A1 | 10/2008 | Kapoor et al. | |
| 2008/0267144 A1 | 10/2008 | Jano et al. | |
| 2008/0282338 A1* | 11/2008 | Beer | 726/12 |
| 2008/0282344 A1* | 11/2008 | Shuster | 726/21 |
| 2008/0295177 A1 | 11/2008 | Dettinger et al. | |
| 2009/0064326 A1 | 3/2009 | Goldstein | |
| 2009/0182818 A1* | 7/2009 | Krywaniuk | 709/206 |
| 2009/0241191 A1 | 9/2009 | Keromytis et al. | |
| 2010/0064347 A1 | 3/2010 | More et al. | |
| 2010/0095377 A1* | 4/2010 | Krywaniuk | 726/22 |
| 2010/0198928 A1* | 8/2010 | Almeida | 709/206 |
| 2010/0312843 A1* | 12/2010 | Robinson | 709/206 |
| 2011/0078587 A1* | 3/2011 | Guy et al. | 715/752 |

FOREIGN PATENT DOCUMENTS

| | | |
|---|---|---|
| EP | 1 278 330 | 1/2003 |
| EP | 1 280 040 | 1/2003 |
| EP | 1 457 885 | 9/2004 |
| EP | 1 510 945 | 3/2005 |
| EP | 1571578 A | 9/2005 |
| EP | 1 638 016 | 3/2006 |
| GB | 2418330 | 3/2006 |
| JP | 2000-235540 | 8/2000 |
| WO | WO 96/05549 A1 | 2/1996 |
| WO | WO 96/42041 | 12/1996 |
| WO | WO 01/24012 | 4/2001 |
| WO | WO 2005/017708 | 2/2005 |
| WO | WO 2005/119488 | 12/2005 |
| WO | WO 2006/027590 | 3/2006 |
| WO | WO 2006/062546 | 6/2006 |
| WO | WO 2006/136605 | 12/2006 |
| WO | WO 2007/059428 A | 5/2007 |
| WO | WO 2007/106609 | 9/2007 |

OTHER PUBLICATIONS

Adam Lyon, "Free Spam Filtering Tactics Using Eudora,", May 21, 2004, pp. 1-4.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, December, Issue XP000601363, pp. 41-48, Sections 1,3., London.

Gittler F., et al., The DCE Security Service, Pub: Hewlett-Packard Journal, Dec. 1995, pp. 41-48.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion for International Application No. PCT/GB2005/003482, Dec. 9, 2005.

International Search Report dated Aug. 7, 2009 for International Application No. PCT/US2009/037436.

PCT International Search Report and Written Opinion for International Application No. PCT/US2008/052483, Feb. 11, 2009.

Reid, Open Systems Security: Traps and Pitfalls, Computer & Security, 1995, Issue 14, pp. 496-517.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Stein, Web Security—a step by step reference guide, Addison-Wesley, 1997, pp. 387-415.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL: ftp://ftp.rocksoft.com/clients/rocksoft/papers/vercty10.ps>, Sep. 12, 1994.

Zhang et al., The Role of URLs in Objectionable Web Content Categorization, Web Intelligence, 2006.

"Google + StopBadward.org = Internet Gestapo?", http://misterpoll.wordpress.com/2007/01/05/google-stopbadwareorg-internet-gestapo/, Jan. 5, 2007.

"Trends in Badware 2007", StopBadware.org.

George, Erica, "Google launches new anti-badware API", http://blog.stopbadware.org//2007/06/19/google-launches-new-anti-badware-api, Jun. 19, 2007.

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

Invitation to Pay Additional Fees and, Where Applicable, Protest Fee dated Aug. 21, 2009 for International Application No. PCT/US2009/037436.

Aviv et al., SSARES: Secure Searchable Automated Remote Email Storage, 23rd Annual Computer Security Applications Conference, Jan. 2, 2008, pp. 129-138.

Borck, James R., Clearswift makes a clean sweep of Web threats, originally downloaded from http://www.infoworld.com/d/security-central/clearswift-makes-clean-sweep-web-threats-818., Aug. 22, 2007, pp. 2.

Broder et al., Network Applications of Bloom Filters: A Survey, Internet Mathematics, Apr. 13, 2004, vol. 1, Issue 4, pp. 485-509.

Honoroff, Jacob, An Examination of Bloom Filters and their Applications, originally downloaded from http://cs.unc.edu/~fabian/courses/CS600.624/slides/bloomslides.pdf, Mar. 16, 2006, pp. 113.

IronPort Web Reputation White Paper, A Comprehensive, Proactive Approach to Web-Based Threats, Ironport Systems,, 2009, pp. 10.

IronPort Web Reputation: Protect and Defend Against URL-Based Threats; Ironport Systems, Apr. 2006, 8 pages.

Long, John A., Risk and the Right Model, originally downloaded from http://www.dtic.mil/cgi-bin/GetTRDoc?Location=U2&doc=GEtTRDoc.pdf&AD=ADA161757, Jan. 1986, pp. 13.

Rubenking, Neil J., Norton Confidential, originally downloaded from http://www.pcmag.com/article2/0,2817,1999239,00.asp, Aug. 4, 2006, pp. 3.

Shanmugasundaram et al, Payload Attribution via Hierarchical Bloom Filters, CCS, Oct. 25-29, 2004.

Shanmugasundaram et al., ForNet: A Distributed Forensics Network, In Proceedings of the Second International Workshop on Mathematical Methods, Models and Architectures for Computer Networks Security, 2003.

Clear Text Password Risk Assessment Documentation, SANS Institute, 2002.

Song et al., Multi-pattern signature matching for hardware network intrusion detection systems, IEEE Globecom 2005, Jan. 23, 2006.

Spafford, Eugene, Prventing Weak Password Choices, Computer Science Technical Reports. Paper 875. http://docs.lib.purdue.edu/cstech/875, 1991.

Yang et al., Performance of Full Text Search in Structured and Unstructured Peer-to-Peer Systems, Proceedings IEEE Infocom; originally downloaded from http://ieeexplore.ieee.org/stamp/stamp.jsp?arnumber=04146962, 2006, pp. 12.

Ruffo et al., EnFilter: A Password Enforcement and Filter Tool Based on Pattern Recognition Techniques, ICIAP 2005, LNCS 3617, pp. 75-82, 2005.

* cited by examiner

SYSTEM AND METHOD FOR ANALYSIS OF ELECTRONIC INFORMATION DISSEMINATION EVENTS

BACKGROUND OF THE INVENTION

1. Field of the Invention

The present invention relates generally to the field of information leak prevention. More specifically but not exclusively, the present invention deals with methods for an efficient and accurate analysis of information dissemination events.

2. Description of the Related Technology

Information and knowledge created and accumulated by organizations and businesses are, in many cases, their most valuable assets. Unauthorized dissemination of intellectual property, financial information and other confidential or sensitive information can significantly damage a company's reputation and competitive advantage. In addition, private information of individuals inside organizations, as well as private information of clients, customers and business partners may include sensitive details that can be abused by a user with criminal intentions Apart from the damage to both business secrecy and reputation, regulation within the US and abroad poses substantial legal liabilities for information leakage: Regulations such as the Health Insurance Portability and Accountability Act (HIPAA), the Gramm-Leach-Bliley act (GLBA) and the privacy-protecting laws of various states and nations imply that the information assets within organizations should be monitored and subjected to an information protection policy in order to protect client's privacy and to mitigate the risks of potential misuse and fraud.

One of the major challenges in preserving the confidentiality of information and knowledge in modern organizations and businesses is information leaks caused by an authorized user. It turns out that such events of unauthorized dissemination of information, especially via e-mail, are prevalent and happen in many large organizations almost on a daily basis.

An important aspect of information leakage events by authorized users is the variety of motives, intentions and disposition used in leakage of the electronic information. For example the leakage may be caused by an honest mistake (e.g., using the "reply to all" instead of the "reply" option in the email client may result in sending confidential information to an unauthorized recipient outside the organization), by an attempt to "bending the rules" (e.g., working on a confidential document at home) or from a malicious attempt of information dissemination motivated by greed or anger.

Handling events of unauthorized dissemination of electronic information in the business environment is extremely demanding because modern organizations produce immense amounts of electronic traffic and it is essential, on the one hand, to maintain the legitimate flow of electronic information undisturbed while, on the other hand, the confidentiality of the information must be maintained. In many cases, deciding whether the information in a particular case is indeed confidential is a difficult and subjective task, and the trade-offs between risking the confidentiality of the information versus disturbing an important business process are far from being clear. In this respect, the question of motivation of the information dissemination becomes important. If the dissemination event is either part of a legitimate (yet problematic) business process or an innocent mistake of the sender, it may be best handled by the sender himself. On the other hand, if the motive for the dissemination is malicious, it is probably better to block the dissemination without letting the sender know about it.

Current attempts to monitor and enforce policies with respect to electronic information dissemination are, in general, substantially agnostic to motives. This lack of understanding of motives induces less than optimal event handling.

SUMMARY

A system and method for an efficient and accurate analysis of events of electronic information dissemination is described. The method is based on analyzing and inferring the most probable motives of the dissemination event using various heuristics and/or by looking at various frequent scenarios and asserting the plausibility of each one of these scenarios. The scenarios include motives, intentions and disposition of the sender and the recipients. The results of the heuristic and scenario-based analysis are preferably used thereafter by a decision system in order to provide the best event handling.

A system and method for determining an intent of a sender in transmitting electronic information in order to prevent unauthorized dissemination of electronic information is disclosed. The system and method facilitate cost-effective handling of dissemination events and comprise a traffic analyzer configured to analyze descriptors of the electronic information and parameters of the transmission of the electronic information in order to determine the intent of the sender. By determining the intent of the sender, it is possible to effectively quarantine the electronic information before it is disseminated. The descriptors describe at least the content of the message, the sender of the message, and the recipient of the message.

The traffic analyzer comprises an intention assessment unit for analyzing the descriptors and parameters of the electronic information and determines if the intent in sending the electronic information is malicious or a mistake. The intention assessment unit is configured to determine whether the electronic information should be disseminated based on the intent of the sender and also to determine whether the decision about dissemination should be made by the sender. The intention assessment unit also evaluates a confidence level and severity of the electronic information being disseminated in determining whether to disseminate the electronic information. Furthermore, the intention assessment unit can compare the descriptors and parameters of the electronic information to predefined scenarios in order to determine whether the electronic information should be disseminated. The predefined scenarios are generated from previous electronic information dissemination events and the comparison includes finding a nearest neighbor between the descriptors and parameters and the predefined scenarios. Additionally, it is possible to use heuristics based on the email addresses of the senders and the recipients to assess the intention of the sender.

A method for identifying a problematic business policy in the transmission of electronic messages is disclosed. The method includes determining the number of electronic messages that were transmitted that violated a prescribed business policy, determining the senders who sent the electronic messages and analyzing the recipients of the electronic messages. Then it is determined whether the business policy for the transmission of the electronic message is problematic in response to the number of electronic messages, the senders of the electronic messages and the analysis of the recipients of the electronic messages. The step of analyzing the recipients of the electronic messages further comprises analyzing the recipient's addresses for positive and negative indicators that the recipient should be receiving the electronic message. The positive indicators of receipt comprise the recipient's affiliation and the negative indicators or receipt comprise the recipients address belonging to a domain of low reputation.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION OF CERTAIN INVENTIVE EMBODIMENTS

Figure 1:
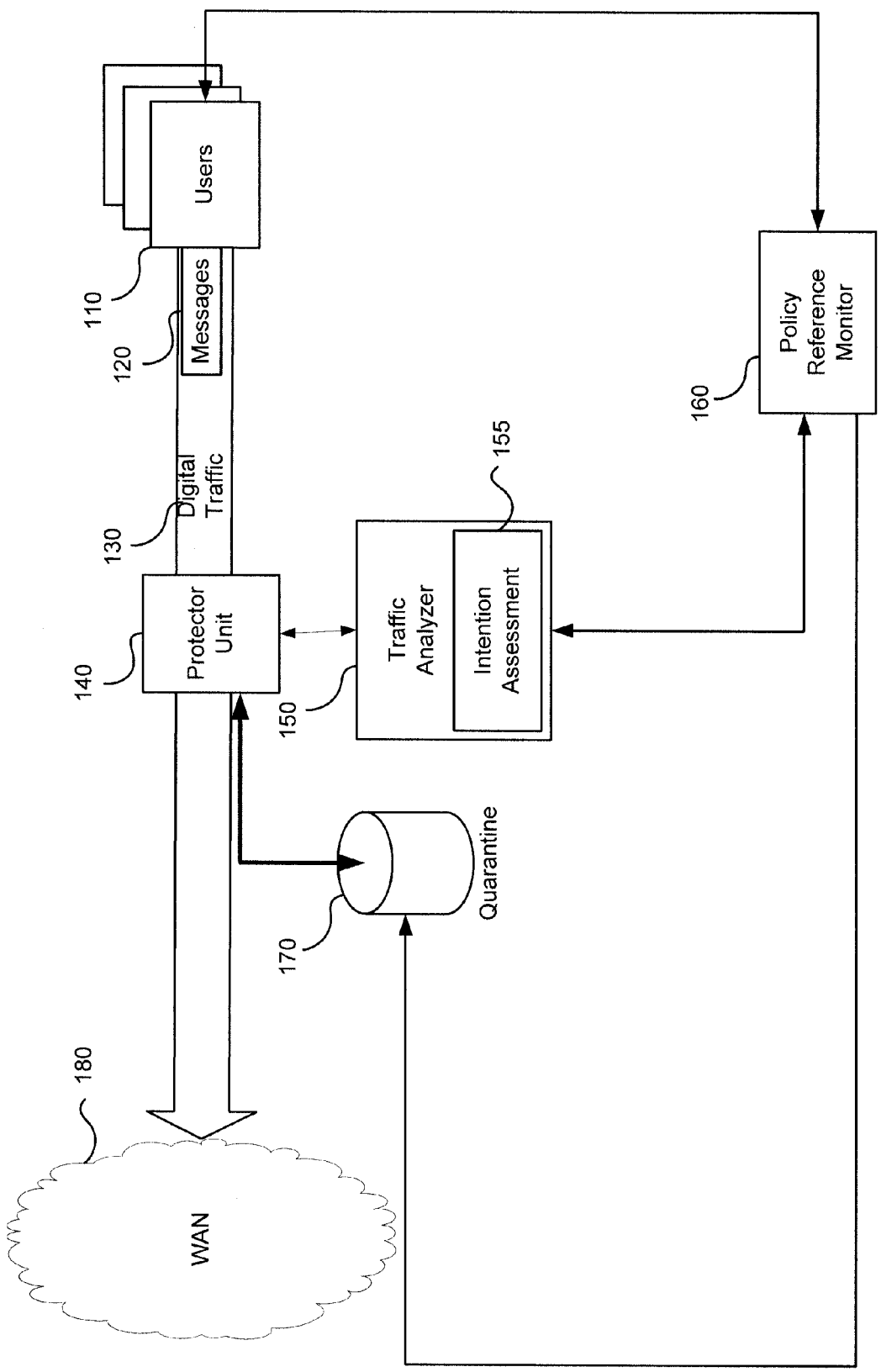
FIG. 1 is an illustration of a system for information leak prevention that utilizes scenario analysis and assessing of motives.

The inventors of the systems and methods described in this application have recognized a need for a method and system that includes the probable motives, intentions and disposition of electronic information dissemination events in determining how the dissemination should be handled. Disclosed herein is a method and system which provides for efficient mitigation of hazards stemming from electronic information leakage, and is operable to mitigate information leakage which occurs when users inside a company breach and/or otherwise compromise confidential data, whether it is private employee or customer details, or the intellectual property of the company. These breaches can take the form of emails sent outside the company, uploading information to the web/Internet, instant messaging, printing, copying data to portable devices etc.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting. Also, it will be recognized that the described components are illustrative and non-limiting and may be implemented solely in software, hardware or the combination of both.

There are several patterns where well-meaning users may leak electronic information unintentionally. The most common pattern is the simple mistake whereby, for example, electronic information is exposed to the wrong eyes by clicking "reply to all" instead of "reply" while answering a sensitive email, or trusting an email client's auto-complete feature and sending secrets to "John deCompetitor" instead of to "John deCoworker." In other cases, a distribution list is put in the "CC" field instead of the "BCC" field and reveals sensitive names and email addresses.

Another common pattern that is attributed to modern lifestyle is the "work at home" pattern where an industrious employee may send material containing confidential information to her home webmail account to continue working after work hours, thereby breaching the confidentiality of the materials and company policy.

Yet another pattern is "eagerness to please" which is the bread and butter of so-called "social engineers". Most people like to be helpful and may willingly disclose confidential information if the asker seems trustworthy and harmless enough. Social engineers may be able to obtain even the most classified material, like source-code and passwords, simply by asking other people for help in a seemingly innocent manner.

On the other hand, malicious users who knowingly and deliberately breach security and confidentiality can cause considerable damage. Motivated by greed or discontent, malicious users are a less common source of breaches, but because their attempts are focused the average damage per incident may be greater. In organizations that do not adequately monitor their outgoing information, it is very easy for such a malicious user to successfully breach confidentiality by just sending out classified documents using webmail. Indeed, it turns out that simple and conspicuous malicious leaks occur often. This can happen, for example, when employees intend to leave the company, and send themselves confidential information like customer portfolios, or technical drawings and source code.

Between the malicious and well intentioned are the misbehaved patterns. These are behaviors caused by users who do not fully appreciate the value of the company's assets and do not exercise proper caution. Common examples include gossiping, or sharing novel (and confidential) details with friends An important aspect of the problem of information leakage stems from the inherent difficulty in defining confidential information. Apart from relatively prima facie cases, there is a wide "gray area" as to what should be classified as confidential. Assessing the level of confidentially of the information at hand and defining its relevant distribution and usage policy may be subjective, as different people may have different opinions with respect to the confidentiality level and the impact of the distribution policy on business processes. In addition, any automatic system may suffer from false positives such that the system may mistakenly assign a more restrictive policy than it should. To that end, if it can be safely ascertained that a certain event stems from either a false positive of the decision system or an innocent mistake on behalf of the sender, the best mitigation and handling of the electronic information may be to return the message to the sender together with the findings of the decision system and let the sender decide about the desired action, taking into account the relevant trade-off between confidentiality and availability. Since in large organizations the amount of electronic traffic may be immense, and, consequently, the potential frequency of confidential information dissemination events may be high, the cost reduction that can be achieved by distributing the event-handling may be substantial.

If, on the other hand, there are grounds to assume that the incident is malicious, the system shouldn't allow the sender to handle the event. Indeed, the sender himself should be "handled" by the authorities of the organization using the evidence gathered by the system. Without inferring to motives of the sender, it would be hard to provide an adequate resolution to the problem.

The following embodiments describe a system for an efficient assessment of motives and scenarios of electronic information leakage events. Along with the description, each scenario may refer to the entire context of an event of electronic information dissemination, which may include the following details:

The source of the message (identity of the sender and the machine);
The intention of sender;
The destination of the message;
The disposition of the destination;
Classification of the information in the message;
Details regarding the content of the message;
The channel of the electronic traffic; and
The time of the transaction.

While some of the elements of a scenario can be extracted easily and unequivocally from the electronic message (e.g., channel, time and the addresses of the source and the destination)—other elements, such as the classification of the message and the identity and the disposition of the recipient, are, in many cases, harder to assess.

The most problematic element is the intention of the sender. Indeed, establishing intent is considered to be a difficult task even in other fields such as criminal and civil law. In an embodiment of the described system, the system attempts to establish intention using various heuristics and by considering the most common scenarios/patterns of electronic information leakage and assigning probabilities to each of the scenarios. The system is particularly useful when utilized within a system for information leak prevention described more fully in the following patent applications, the contents of which are hereby incorporated herein by reference in their entirety:

"A System and a Method for Monitoring Unauthorized Transport of Digital Content", US patent application publication number 20020129140;
"A method and system for managing confidential information", US patent application publication number 20050288939;
"Apparatus and Method for Assuring Compliance with Distribution and Usage Policy", US patent application publication number 20040255147;
"Apparatus and Method for Electronic Mail Filtering", US patent application publication number 20040260924
"Apparatus and Method for Ensuring Compliance with a Distribution Policy" US patent application publication number 20050027980
"A Method and System for Information Distribution Management", US patent application publication number 20050025291

Referring now to FIG. 1, a system for information leak prevention 100 that utilizes scenario analysis and assessing of motives is shown. Users 110 send electronic information such as email messages 120 with digital traffic 130. A protector unit 140 intercepts the electronic message 120 and sends a copy of it to a traffic analyzer 150 that includes an intention assessment subunit 155. The traffic analyzer 150 and the intention assessment subunit 155 review the electronic message 120 and generate analysis results that are transmitted to a policy reference monitor 160 that determines required actions according to pre-defined policies and the analysis results. For example, one possible action is to send problematic electronic messages 120 to quarantine 170 where the message 120 is held. If the intention analysis from the assessment subunit 155 suggests that the most probable scenario is an innocent mistake than the user 110 can be notified that the message 120 is in quarantine. Preferably, the notification message will comprise a code that allows the user 110 to release the message 120 from the quarantine, using the method described in US patent application publication number 2005002529, "A Method and System for Information Distribution Management", the contents of which are hereby incorporated by reference herein in their entirety. The sender can then alter the message to omit (if required) confidential information and/or unauthorized recipients. The released message can then be directed to its destination via the WAN 180.

Figure 2:
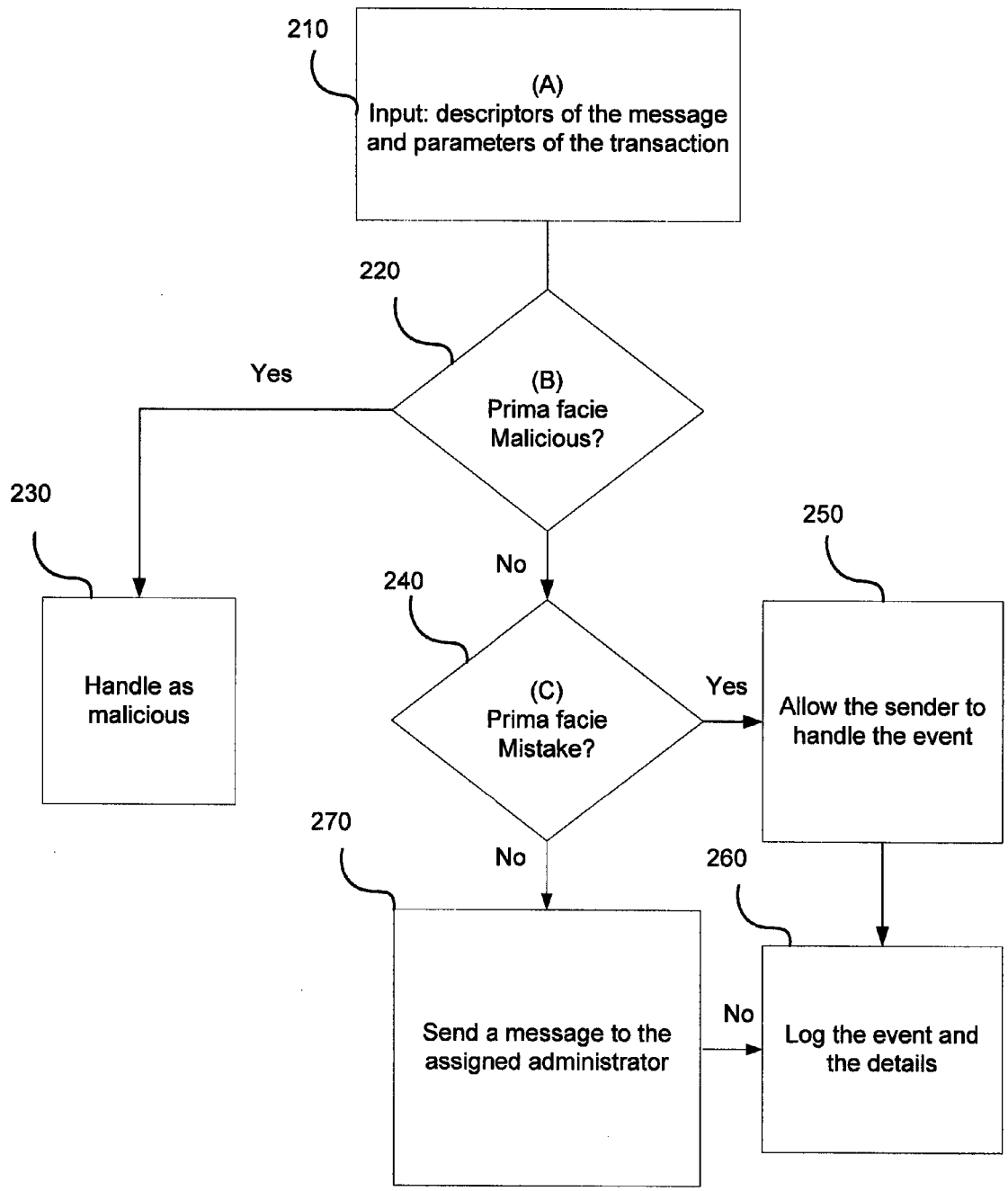
FIG. 2 is flowchart illustrating a method for event handling that utilizes intention assessment.

Assessing the intention of the user 110 by the intention assessment subunit 155 is far from trivial and can be a difficult task. In many cases, the intention can be assessed by inferring the probabilities of some common scenarios of mistakes and prima facie scenarios of malicious intent given the details of the transaction and the content of the message. Referring now to FIG. 2, a method for assessing these probabilities by looking at the descriptors of the transaction and applying heuristics in order to determine the most probable intention is illustrated. At stage A 210, descriptors of the message 120 (such as source of the message, destination of the message, content of the message, etc. . . . ) and parameters of the transaction (such as channel of the message, time of the transaction, etc. . . . ) are inputted into the intention assessment subunit 155. At stage B 220, the subunit 155 assesses whether the event is a prima facie malicious event (e.g. sending details of a large number of credit cards together with the name and the social security numbers of the owners to a dubious address) or not. If the event is a prima facie malicious event, the subunit 155 proceeds to step 230 whereby the event is handled as a malicious event and the desired action is commenced. If the event is not a prima facie malicious case, the subunit 155 proceeds to stage C 240 to decide whether the event is a prima facie mistake (e.g. using heuristics such as: "if a confidential document was sent to several internal email addresses together with one external email addresses—define the event as mistake). If it is a prima facie mistake, the subunit 155 proceeds to step 250 whereby the sender can handle the event preferably using the method described in US patent application number 20050025291 "A Method and System for Information Distribution Management", the contents of which are hereby incorporated by reference herein in its entirety. After allowing the sender to handle the event, the subunit 155 logs the details of the event in step 260. If the subunit 155 determines it is not a prima facie mistake in step 240, the subunit assigns an administrator to handle the case in step 270 and logs the event and details in step 260.

Figure 3:
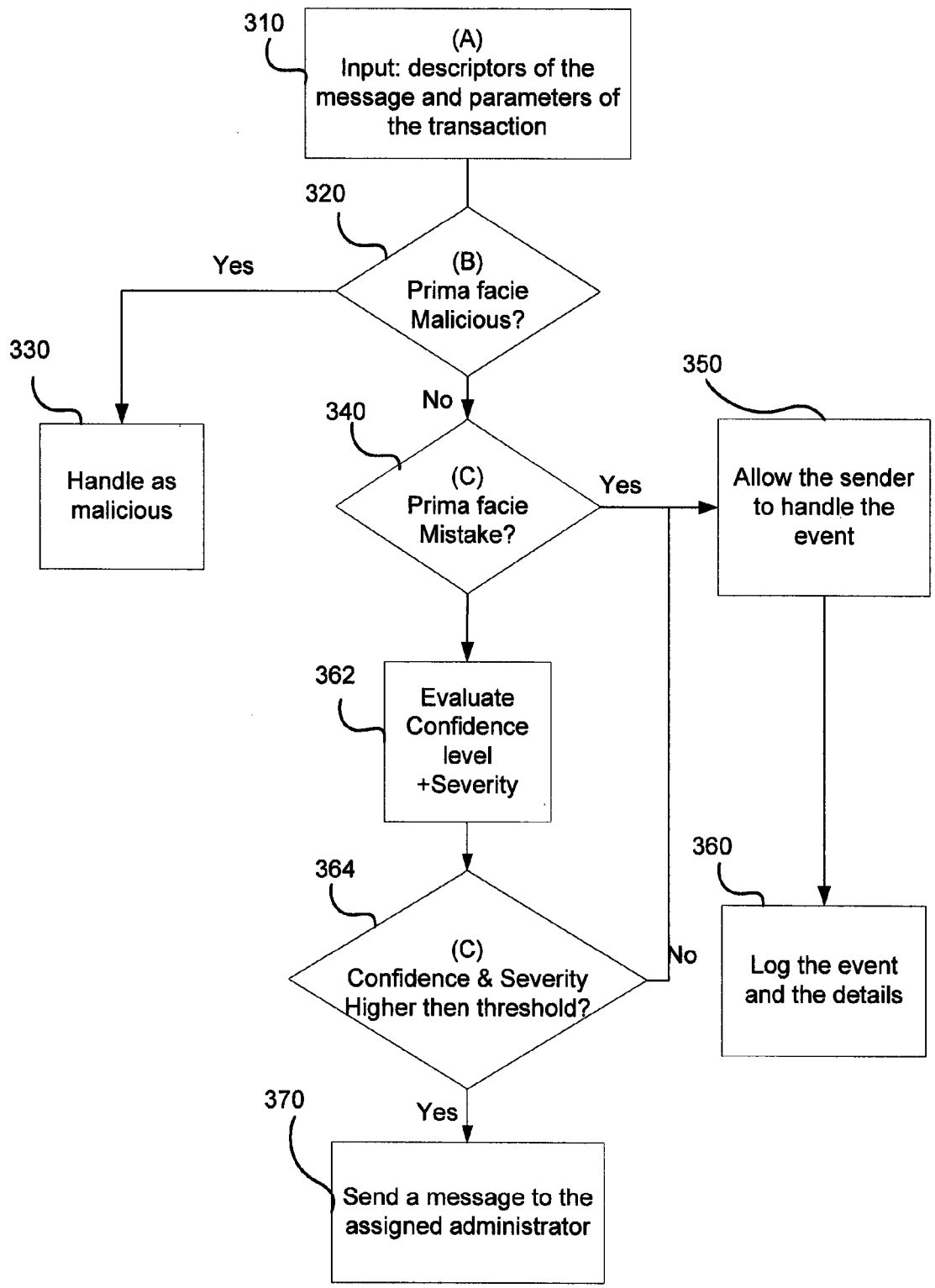
FIG. 3 is flowchart illustrating a method for event handling using the severity of the event and the confidence level of the decision.

Generally, the method for handling events depends on many factors such as the severity level of the breach, the confidence level of the decision system regarding the fact that the event indeed constitutes a breach and the sensitivity of the organization to information leakage. FIG. 3 illustrates a method substantially similar to the method of FIG. 2, and includes allowing the tuning of the maximum severity and confidence level in which the event will be handled by the sender.

More specifically, at stage A 310, descriptors and parameters of the electronic message 120 are inputted into the subunit 155. Next, at stage B 320, the subunit 155 assesses whether the event is a prima facie malicious event. If the event is malicious, the process proceeds to step 330 to be handled accordingly. If the event is not malicious, then the process proceeds to stage C 340 whereby the subunit 155 determines whether the event is a prima facie mistake. If the event is a prima facie mistake, the process proceeds to step 350 whereby the sender can handle the event and step 360 where the event and details are logged. However, if the event is not a prima facie mistake, the process proceeds to stage D 362 whereby the confidence level of the decision (e.g., based on the level of similarity to previously defined confidential information, preferably using the methods described in US patent application number 20020129140; "A System and a Method for Monitoring Unauthorized Transport of Digital Content", and US patent application number 20050288939: "A method and system for managing confidential information", the contents of which are hereby incorporated herein by reference in their entirety) and the severity of the event (based, e.g. on the sensitivity level of the disseminated information and the potential damage that can happen if this information will arrived to a malicious recipient) are evaluated and a numerical value is preferably assigned to each of them. Next at stage E 364, the numerical values assigned to the confidence level and severity are compared to predefined thresholds in order to decide if handling the event should be left to the user or to an assigned administrator. The threshold can be defined by the administrator or a security officer in the organization, in a manner that reflects the organizational policies and procedures with respect to confidential and proprietary information. If the confidence level and severity are higher than the threshold, this indicates that dissemination of the electronic information might not be advisable such that an administrator should be notified in step 370 and the information not transmitted. However, if the confidence level and severity are lower than the predefined threshold, then the process proceeds to step 350 whereby the sender can handle the event and the details are logged in step 360.

Figure 4:
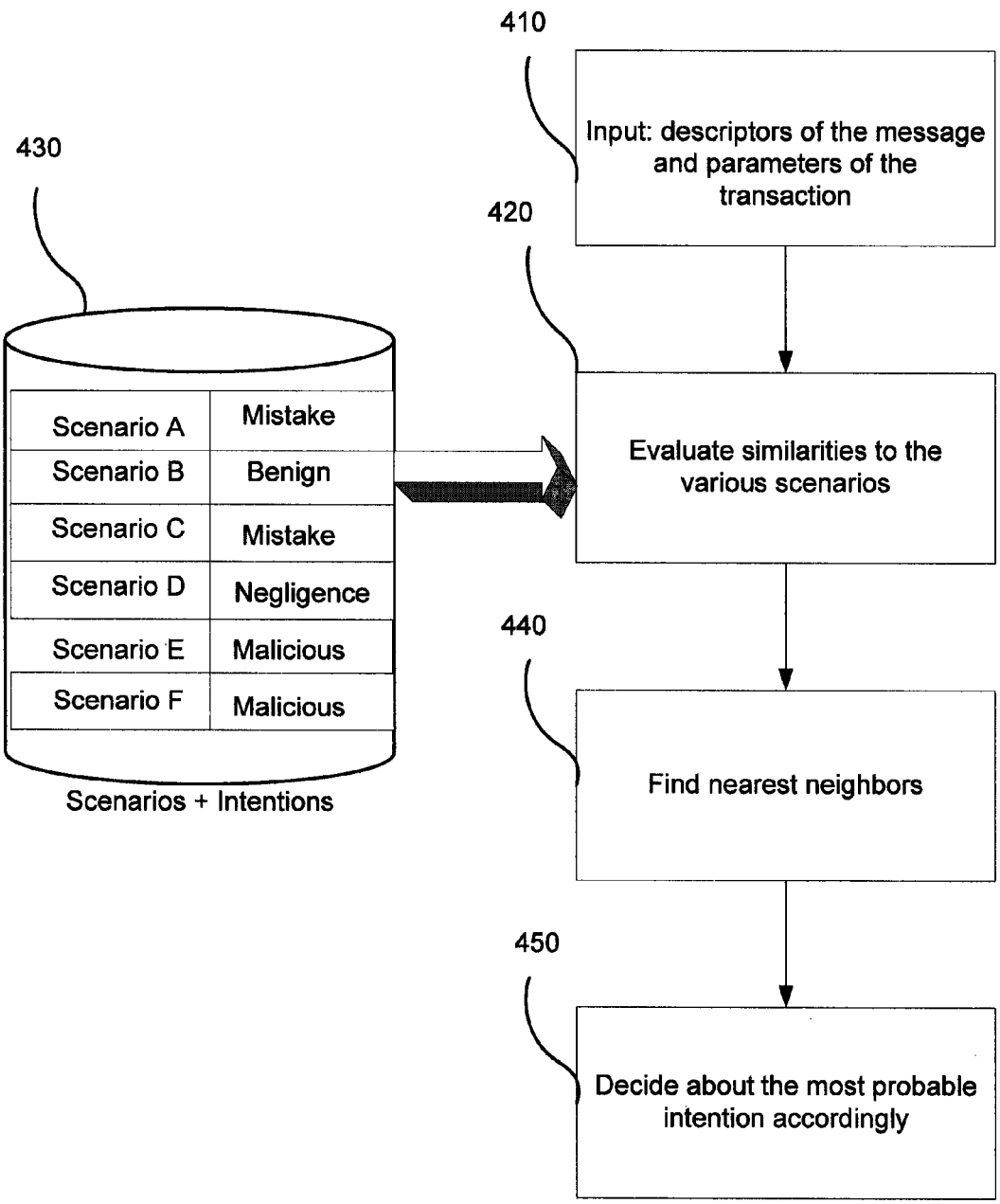
FIG. 4 is an illustration of a method for assessing the motives and the intentions utilizing the nearest neighbors' method.

For events which are not clear-cut, it might be preferable to look at similar scenarios from the past in order to assess the sender's intention. FIG. 4 illustrates a method that utilizes a "nearest neighbor classification" for assessing the intention. At stage A 410, the subunit 155 obtains descriptors of the message and parameters of the transaction as previously described for FIG. 2. At stage B 420, similarities are evaluated between various scenarios stored in the database 430 and the descriptors of the message and the parameters of the transaction inputted from stage A 410. The scenarios in database 430 can be from previously logged and analyzed events together with the most probable intentions. At stage C 440, the most similar scenarios are considered wherein the similarity is based upon the similarities of the descriptors described above. In this respect, the process determines the "nearest neighbor" of the event by comparing the event to predefined scenarios. Next, at stage D 450, the subunit 155 decides about the most probable intention of the sender based upon the nearest neighbor found from stage C 440. Additionally, the subunit 155 may also assign a confidence level to the decision—based on the similarity levels to the nearest neighbors. Once the most probable intention is obtained at stage E 450, the subunit can determine the most appropriate actions such as either transmit the message, quarantine the message and inform the sender, or inform an administrator. Preferably, informing the sender should also include the details of the breach and the action needed to make sending the message allowable (e.g., "Please omit confidential information and/or unauthorized recipients")

Also, the system may utilize some of the following heuristics, based on an analysis of the email addresses within the headers and the body of the message, in order to determine the intention of the user:

1. In cases where the message includes several authorized addresses and one or more unauthorized addresses, the event is, with a high probability, non-malicious.

2. In cases where the message is sent to an internal unauthorized address, which is very similar to another, authorized address, such that, with a high probability, the auto-complete feature of the mail client causes the event, the event is most probably non-malicious.

3. In cases where the user replies to a message using the "reply to all" feature, and the original sender of the replied message is authorized, the event is most probably non-malicious The system can also look for events in which the sender is attempting to send information to his or her web-based mail, by looking for similarities between the name of the sender and the webmail address (e.g., Jerald Regan sends a message to JRegan@webbasedmail.com). The system can assess such similarities using, e.g., the measure of similarity known as the "edit distance" between the string of characters in the name and the string of characters in the prefix of the email address. Such attempts may stem from two basic scenarios:

1. Attempts to "bend the rules" in order to work at home—this is basically a non-malicious scenario, although it should not be considered as an innocent mistake.

2. Attempts to disseminate information for future use when the person involved intends to leave the company (or thinks that he is going to be fired soon)—a malicious event.

As both events cannot be considered as mistake, both of them should preferably be handled by the administrator. However, the severity level of the two events is different. There are several parameters that can be used in order to determine the likelihood of each of the two scenarios:

a. The ownership of the confidential information: in case in which the sender is also the owner of the information.

b. The amount of information: a large number of attached files made the malicious scenario more likely.

c. The diversity of the information: an intention to work at home will be characterized by documents that pertain to a single topic. High diversity of the information (e.g., topics that represents different types of information—e.g., customer's data and R&D documents) are more likely to stem from a malicious intent. The diversity of the information can be assessed using content classification methods, such as described, e.g., in US patent application publication number 20050288939, "A method and system for managing confidential information", the contents of which are hereby incorporated herein by reference in their entirety.

d. The job title and the level of the sender—in most organizations, it will be reasonable to assign a lower level of severity to information dissemination events conducted by top-tier management. (e.g., top-level management in large organizations are less likely to conduct a scam based on identity theft than a low-tier sender).

Figure 5:
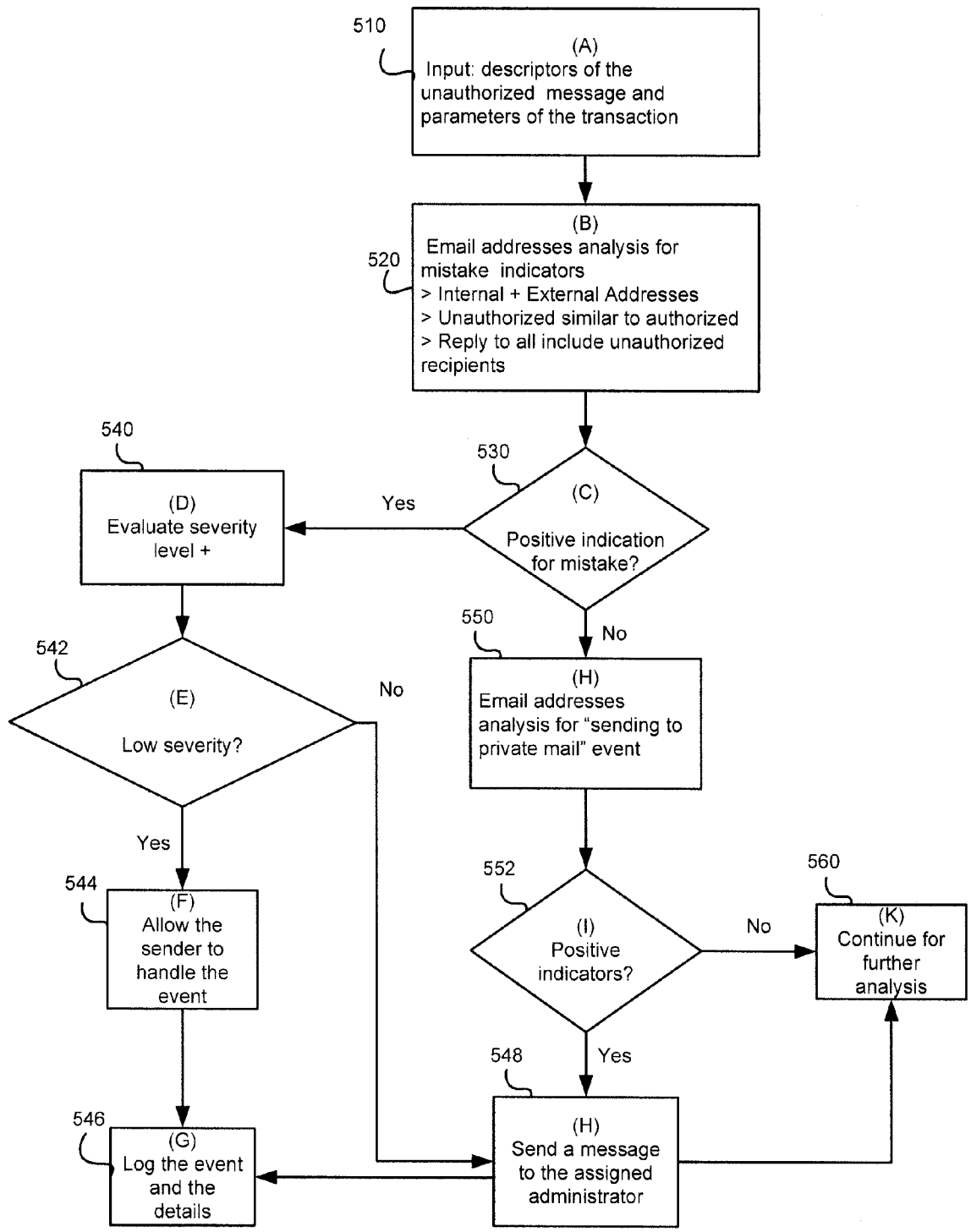
FIG. 5 is an illustration of a method for assessing the motives and the intentions using heuristics based mainly on email address analysis.

Reference is now made to FIG. 5, which illustrates a method for assessing the intension of the user based on various heuristics as described above. More specifically, at stage A 510, the subunit 155 obtains descriptors and parameters of the electronic message that is suspected as unauthorized. Next, at stage B 520, the email addresses of the message are analyzed, e.g., according to the heuristics described above, in order to assess whether the event is, most likely, a result of a mistake (stage C, 530). If there are positive indications for mistake, then, at stage D 540, the subunit 155 assess the severity level of the event (e.g., based on the potential damage of the unauthorized dissemination). At stage E 542, the subunit 155 compares the severity to a predefined threshold: If the severity is lower than a predefined threshold, then the sender is allowed to handle the event at stage F 544 and the details of the event and the actions of the sender are logged at stage G 546. Otherwise, a message is sent to the assigned administrator at stage H 548 who handles the event according to the applicable policies and procedures. Again, the details of the event and the actions taken are logged at stage G 546. If there are no positive indications for mistake at stage C 530, the subunit 155 further looks for evidence that the information was sent to the private address of the sender at stage H 550. If there are positive indicators for such scenario at stage I 552, then a message is sent to the assigned administrator at stage H 548 who then handles the event according to the applicable policies and procedures. The details of the event and the actions taken are logged at stage G 546. If there are no such indicators, the message may continue for further analysis at stage K 560.

The system can also look at attempts to conceal the outgoing message as an indicator of malicious intent. Such attempts can be based on replacing characters with other characters (e.g., p@tent instead of "patent", "$3cr3t" instead of "Secret" etc.) Methods for detection of such manipulations are described in US patent application publication number 20050288939, "A method and system for managing confidential information", the contents of which are hereby incorporated herein by reference in their entirety.

Also, the system can infer recidivation patterns of the users and determine accordingly the disposition of the event taking into account the fact that the user was engaged in similar events in the past, Preferably, the system utilizes methods such as those described in US patent application publication number 20050027980, "Apparatus and method for ensuring compliance with a distribution policy", the contents of which are hereby incorporated herein by reference in their entirety, in order to handle recidivate patterns of the users.

Figure 6:
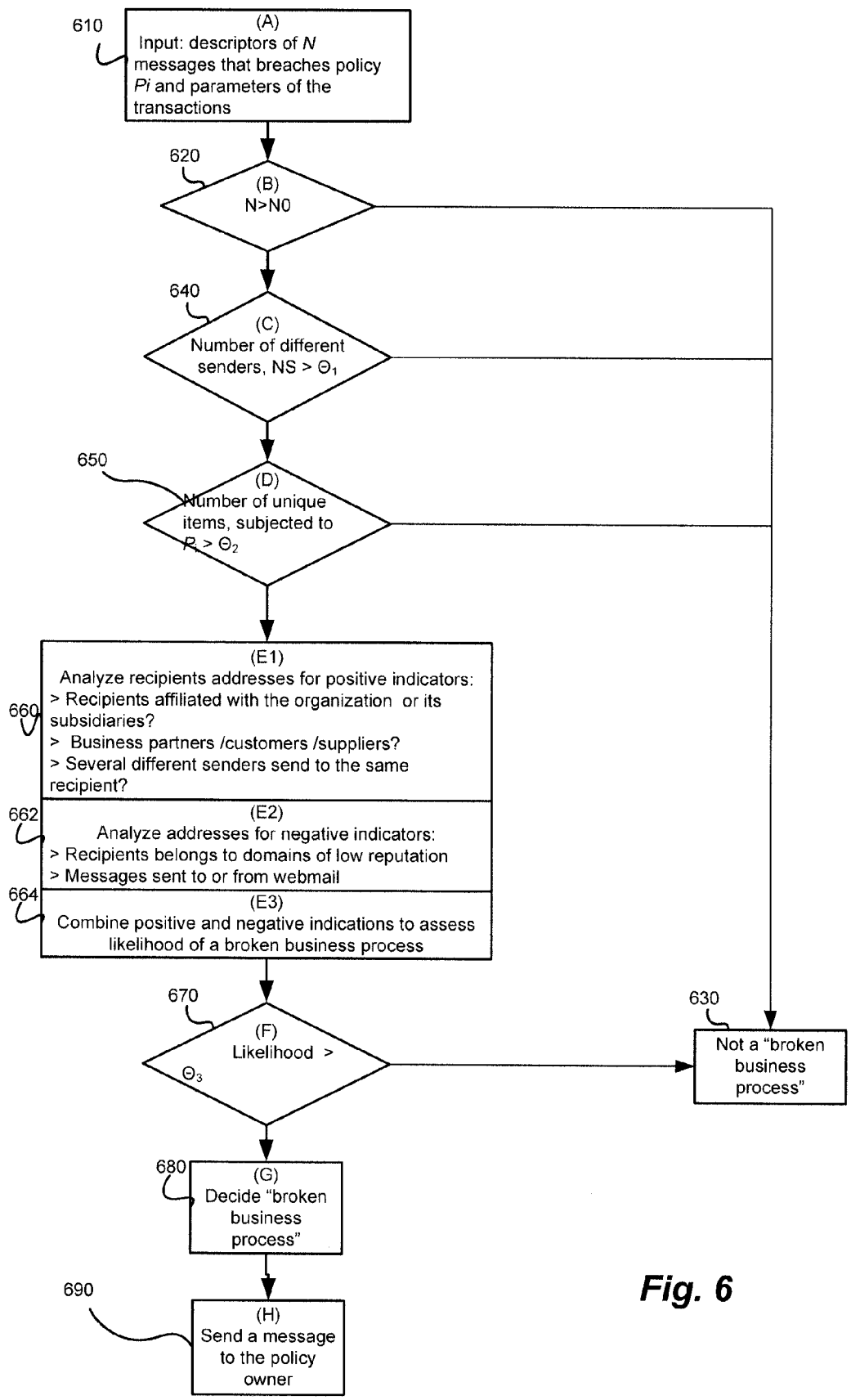
FIG. 6 is an illustration of a method for assessing the plausibility of existence of a broken business process.

The system can also identify problematic ("broken") business processes, where confidential or non-public information is sent in a manner that may expose it to unauthorized recipients (e.g., sending confidential information to another branch or a subsidiary of the company without any encryption). Such events are non-malicious and may stem from a malformed organizational policy or common mistakes. Identifying broken business processes can be based on the method illustrated in FIG. 6 whereby messages that breach a certain policy Pi, preferably in a prescribed time frame (for example, during the last month) are counted as number N at stage A 610. Next, at stage B 620, N is compared with a predefined threshold N0 in order to determine the frequency of such events. Broken business process are characterized, in general, by the fact that the same type of breach is repeated as part of a routine operation, so one can accept that N should be large enough. The level of the threshold, N0, will depend, in general, on the idiosyncratic characteristics of the organization or businesses and the volume of the traffic. If N is smaller or equal than N0, then it is, most probably, not a broken business process at stage 630. If N is larger than N0, then the number of different senders, NS, is compared with a threshold $\Theta 1$ at stage C 640, and the number of unique items, that breached the Policy Pi, NPi, is compared with another threshold, $\Theta 2$ at stage C 650. Again, if Ns$\leq\Theta 1$ or NPi$\leq\Theta 2$, then it is, most probably, not a broken business process and the process proceeds to stage 630. If both Ns>$\Theta 1$ and NPi>$\Theta 2$ then the likelihood of a broken business process is further assessed at stage E1 660 whereby the recipients addresses are analyzed for positive indicators of a broken business process, such as:

Are the recipients affiliated with the organization or its subsidiaries?

Are the recipients business partners, customers or suppliers?

Do several different senders send to the same recipient?

At stage E2 662, the recipient addresses and the methods of sending are analyzed for negative indicators, such as:

Are the recipients belonging to domains of low reputation?

Were the messages sent to or from webmail?

At stage E3 664, the positive and negative indications are combined in order to assess the likelihood of a broken business process. At stage F 670, the assessed likelihood is compared with a likelihood threshold $\Theta 3$. If the likelihood is greater than $\Theta 3$ the decision is "broken business process" at stage G 680 and a message is preferably sent to the policy owner at stage H 690. Otherwise the decision is negative at stage 630.

The methods and apparatus disclosed herein address the shortcomings of the presently known configurations by providing a method and system to allow for an efficient handling of events of unauthorized dissemination of information in a digital traffic filtering system.

It is appreciated that one or more steps of any of the methods described herein may be implemented in a different order than that shown while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. A person skilled in the art can appreciate that the above combinations are not exhaustive and that all reasonable combinations of the above features are hereby included in the present disclosure.

What is claimed is:

1. A computerized system for determining an intent of a sender in transmitting electronic information in order to prevent unauthorized dissemination of the electronic information and to facilitate cost-effective handling of dissemination events, the system comprising:

computer hardware configured by instructions to determine whether a distribution list of the electronic information includes both a plurality of authorized addresses and one or more unauthorized addresses, and configured by instructions to determine whether the distribution list of the electronic information includes an unauthorized address whose edit distance from another authorized address is below a threshold, and configured by instructions to determine whether the sender replies to an original message using a reply to all feature to transmit the electronic information, and an original sender of the original message is authorized, and configured to execute an intention assessment unit to determine if the intent in sending the electronic information is malicious or a mistake, wherein the sender's intent is determined to be a mistake if:

a distribution list of the electronic information includes both a plurality of authorized addresses and one or more unauthorized addresses, or the distribution list of the electronic information includes an unauthorized address whose edit distance from another authorized address is below a threshold, or the sender replies to an original message using a reply to all feature to transmit the electronic information, and an original sender of the original message is authorized.

2. The system of claim 1, wherein the electronic information comprises descriptors, and wherein the descriptors comprise at least one of the content of the message, the sender of the message, and a recipient of the message.

3. The system of claim 1, wherein the intention assessment unit is configured to determine whether the electronic information should be disseminated.

4. The system of claim 1, wherein the intention assessment unit is configured to determine whether the decision about dissemination of the information should be made by the sender.

5. The system of claim 4, wherein the intention assessment unit evaluates a confidence level based on previously defined confidential information and a severity based at least in part on the potential damage if the electronic information is disseminated.

6. The system of claim 1, wherein the electronic information comprises descriptors and parameters and wherein the intention assessment unit compares the descriptors and parameters of the electronic information to predefined scenarios in order to determine whether the electronic information should be disseminated.

7. The system of claim 6, wherein the predefined scenarios are generated from previous electronic information dissemination events.

8. A computer-implemented method for determining an intent of a sender in transmitting electronic information in order to prevent unauthorized dissemination of the electronic information, the method comprising:
 receiving the electronic information from a computer network;
 determining descriptors and parameters of the electronic information, wherein the descriptors and parameters include a message distribution list;
 determining a first condition, based on the descriptors and parameters, of whether the message distribution list includes both a plurality of authorized addresses and one or more unauthorized addresses;
 determining a second condition, based on the descriptors and parameters, of whether the distribution list of the electronic information includes an unauthorized address whose edit distance from another, authorized address is below a threshold, or
 determining a third condition, based on the descriptors and parameters, of whether the sender replies to an original message using a reply to all feature to transmit the electronic information, and an original sender of the original message is authorized; and
 determining the sender mistakenly transmitted the electronic information if at least one of the first condition, second condition, and third condition are true;
 sending a network message to the sender if the sender mistakenly transmitted the electronic information.

9. The method of claim 8, further comprising determining whether the intent of the sender is malicious.

10. The method of claim 8, further comprising:
 determining a confidence level based on a level of similarity of the electronic information to previously defined confidential information;
 determining a severity based at least in part on the potential damage if the electronic information is disseminated; and
 determining the intent of the sender based, at least in part, on the severity and the confidence level.

11. The method of claim 10, further comprising determining whether the electronic information should be quarantined based, at least in part, on the determined intent of the sender.

12. The method of claim 11, further comprising determining whether the decision about releasing the electronic information from the quarantine should be made by the sender based, at least in part, on the determined intent of the sender.

13. The method of claim 8, further comprising comparing the descriptors and parameters of the electronic information to predefined scenarios in order to determine the intent of the sender.

14. The method of claim 13, wherein comparing the descriptors and parameters of the electronic information to predefined scenarios comprises finding a nearest neighbor between the descriptors and parameters and the predefined scenarios.

15. The method of claim 8, further comprising applying heuristics based on the email addresses of the sender and one or more recipients in the distribution list to assess the intention of the sender.

16. The method of claim 8, further comprising determining whether the electronic information should be disseminated based, at least in part, on the determined intent of the sender.

17. The method of claim 8, further comprising using the determined intent of the sender in determining whether the decision about dissemination of the information should be made by the sender.

18. The method of claim 11, further comprising informing the sender of the actions required to release the message from quarantine.

* * * * *